Oct. 13, 1942.                J. N. WHEELER                2,298,323
                       THERMOSTATIC CONTROL DEVICE
                          Filed Jan. 30, 1941
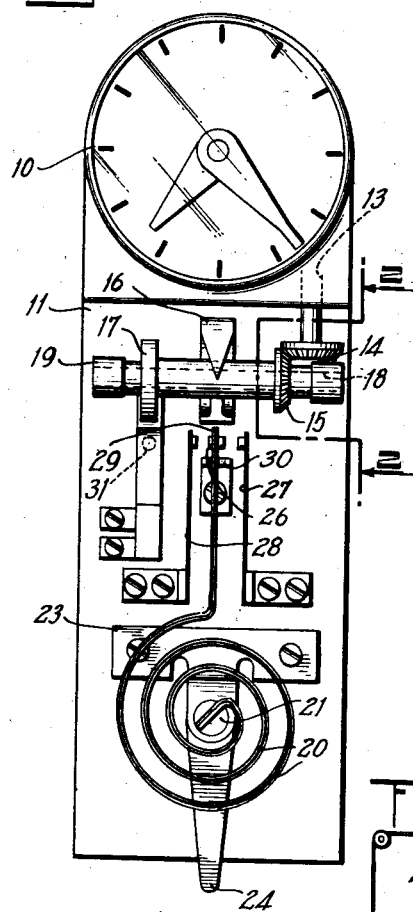
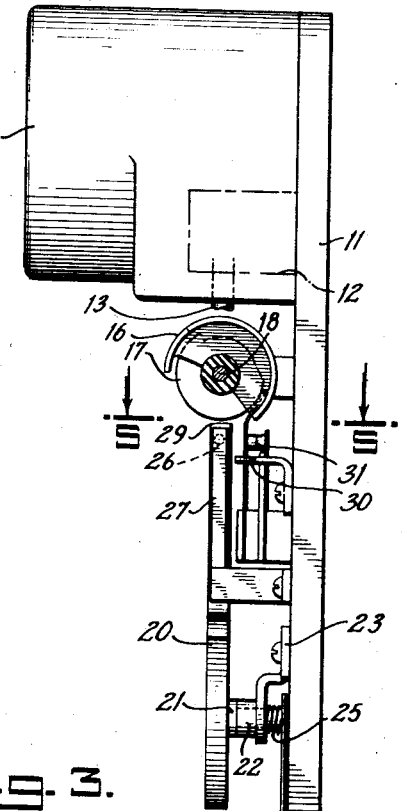
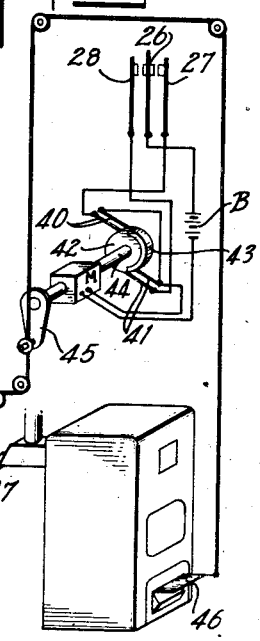
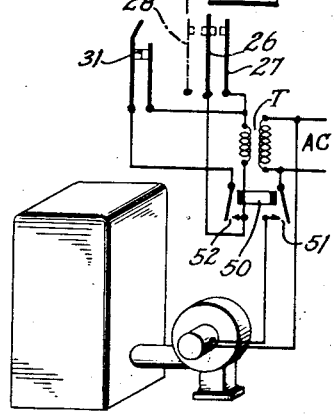
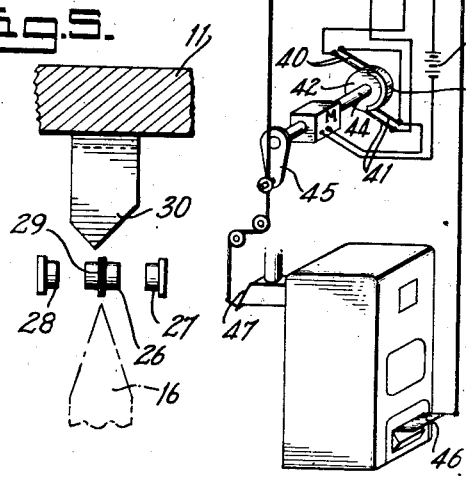
INVENTOR
John N. Wheeler
BY William A. Harmon
ATTORNEY Patented Oct. 13, 1942

2,298,323

UNITED STATES PATENT OFFICE 2,298,323

THERMOSTATIC CONTROL DEVICE

John N. Wheeler, Hawthorne, N. Y.

Application January 30, 1941, Serial No. 376,629

11 Claims. (Cl. 175—320)

The instant invention pertains to thermostatic control devices such as are customarily employed in regulating the heat output of ordinary coal furnaces, oil burners and the like.

Temperature controlling units employing a bi-metal strip in one form or another as the thermal element are of common knowledge in the art. Equally well known is the fact that when bi-metal strips alone are used, unsatisfactory conditions often arise with regard to the making and breaking of associated control circuits if unaided by auxiliary devices such as magnets, toggle mechanisms and the like. Such devices, however, do not maintain temperature control within the desirable limits of variance for many practical purposes.

It has been found that these devices either do not solve the problem in an altogether satisfactory manner or are so bulky and detailed in their construction as to involve rather high manufacturing costs.

It is, therefore, the general object of the present invention to provide a temperature controlling unit comprising a thermal element and an improved auxiliary device for supplementing the operation of the element, the latter device being simple in its construction and highly efficient in its operation so as to maintain substantially constant temperature control.

More specifically, an object of the invention resides in the provision of novel auxiliary means for moving the bi-metal strip positively into circuit-closing position.

Another object is to provide a unique sensing means as a component part of the auxiliary moving means for sensing periodically the position of the bi-metal strip, thereby determining whether or not the strip is to be moved into circuit-closing position. Similarly, where there are two separate control circuits, one for raising the temperature, and the other for lowering the same, an object is to provide for determining, under control of the sensing means, which of two circuit-closing positions the thermal element will be made to assume upon its periodic operation.

Still another object is the provision of an improved control circuit including a periodically closing switch which is timed to overlap the break in the circuit caused by movement of the bi-metal strip away from circuit closing position between successive sensing operations.

An additional object is to provide a continuously rotating sensing means which accurately detects the relative position of the thermal element and which is designed so as not to bind on or damage the element in any of its positions.

According to the invention, it is proposed to provide a thermostatic control unit in which the bi-metal strip never reaches circuit-closing position under the effect of temperature changes alone. The strip moves up past a certain point on its way to that position and then is picked up and moved over positively by a rotating cam to close the control circuit. As soon as the cam moves away from the strip it leaves the circuit closing position by reason of its own bias toward the open circuit position. For controlling devices such as oil burners, for example, it is advisable to provide additional contacts in the control circuit to overlap the break in the circuit as the strip moves to open circuit position. As long as more heat is being called for, the strip is moved periodically to the closed circuit position and the control circuit is maintained through the cooperation of the strip and the additional contacts to keep the oil burner motor running. For opening the dampers of ordinary coal furnaces, the additional contacts are not necessary. For this type of operation two control circuits are employed and the cam periodically moves the strip to one or the other closed circuit position, to call for more or less heat as the situation demands.

To accomplish the desired results, the proposed invention requires but a few structural parts including merely in addition to the customary bi-metal strip and simple control circuit, a small motor or clock mechanism, a pair of cams, and, in some instances, an additional set of contacts.

Other features and advantages of the invention will be noted from the accompanying drawing in which:

Fig. 1 is a front elevation view of the device with the covers removed showing the relative locations of the various parts.

Fig. 2 is a right side view of Fig. 1, partially in section along lines 2—2.

Fig. 3 is a diagrammatic sketch of one type of control employing transfer contacts.

Fig. 4 is a diagrammatic sketch of one type of control employing only one side of the transfer set of contacts and a pair of cam controlled contacts.

Fig. 5 is a sectional detail view taken along the lines 5—5 of Fig. 2 showing the sensing means for the bi-metal strip.

Referring now to the drawing and particularly to Figs. 1 and 2, the clock 10 is mounted on the base 11 which consists of an insulating material such as a plastic moulding. Within the clock 10 is a drive take-off designated generally at 12 in Fig. 2, the output of which is transmitted through the shaft 13 to the miter gear 14. Shaft 13 is a slowly revolving shaft, of the order of one or two revolutions per minute, for example. Gear 14 meshes with the gear 15 to which is secured a sensing cam 16 and a contact operating cam 17. The gear 15 and cams 16 and 17, which may be considered as a single unit, are rotatably mounted on a shaft 18 which is in turn mounted in the supports 19 integral with the base 11. The sensing cam 16 and the contact actuating cam 17 are made of suitable insulating material. The thermal responsive element 20, which may be a bi-metal strip or other suitable form of thermal element, is secured at one end to shaft 21 mounted in bearing 22 of a bracket 23 on the base 11. To the other end of the shaft 21 is secured an adjusting lever 24 for use in making temperature settings. Mounted between the bracket 23 and lever 24 is a compression spring 25 which holds the shoulder of the shaft 21 in contact with the surface of the bearing hub 22. Each side of the free end of thermal element 20 carries a contact 26. Contacts 26 cooperate with contacts 27 and 28 mounted on opposite sides of the thermal element in accordance with the position of the thermal element under certain conditions as will be described hereinafter. It will be remembered that gear 14 is a slowly revolving gear of the nature of approximately 1 R. P. M. Thus, by providing a one to one ratio with gear 15, the cams 16 and 17 are rotated at the same speed in a counterclockwise direction, as viewed in Fig. 2.

When the temperature in the room is the same as that selected by the setting of the arm 24, the free end 29 of the thermal responsive element will be positioned just to the left of the sensing portion of the cam 16. This may be considered the normal position of the parts. During the rotation of cam 16, the left side of the camming surface (as viewed in Fig. 1) will engage the free end 29 of the thermal element 20 and cause element 20 to be moved to the left to such an extent that contact 26 closes with contact 28. The contacts will be maintained closed for approximately 180° of rotation of cam 16 after which element 20 will be released from engagement with the cam 16 and will return to its normal position as controlled by the temperature of the surrounding atmosphere. A slight decrease in temperature with respect to that selected by the setting of the arm 24 tends to move the free end 29 of thermal element 20 to the right as viewed in Fig. 1. When the element has shifted sufficiently to the right in response to a reduction in temperature, the next sensing operation by the cam 16 causes element 20 to be moved to the right by the action of the right camming surface of cam 16 to close contacts 26 and 27.

In the event that the free end 29 of element 20 should be in such a position that the leading or sensing edge of the cam 16 is on dead center with respect to the free end 29, means is provided to cause the blade to be moved in the same direction whenever this condition occurs. This is accomplished by means of a secondary camming element 30 so positioned that the point of its V-shaped leading edge is slightly offset with respect to the sensing edge of cam 16. Fig. 5 shows cam 16 in dotted position to show this relationship. Thus, if the free end of element 20 is dead center with respect to the sensing edge of cam 16, the element will be moved to the right, as viewed in Fig. 5, until it contacts the camming surface of the member 30, after which its free end 29, through the medium of the latter camming surface, will be moved downwardly as viewed in Fig. 5 or to the right as viewed in Fig. 1.

One useful application of the invention described above is shown in Fig. 3. Briefly this is a means for controlling the dampers of a furnace and functions as follows: Assume as an initial condition that the thermostat has indicated to a control unit, to be described later, that the temperature of the surrounding atmosphere is below requirements, that the dampers of the furnace have thereby been adjusted accordingly as shown in Fig. 3 and that the door 46 has been opened and the draft 47 has been closed. Each rotation of the cam 16 when free end of the element 20 is sensed, as long as the temperature is below that set by the arm 24, contacts 26, 27 will be closed, but no circuits will be completed. When the temperature of the atmosphere reaches that set by the arm 24, the free end 29 of element 20 is moved to the left closing contacts 26 and 28. Upon closure of contacts 26 and 28, a circuit is completed from the plus side of the battery (B) through bracket 23, shaft 21, and thermal element 20, to contacts 26, 28 now closed, to one of the brushes 41, and through the conducting strip 43, the other of the brushes 41, motor M, to the other side of the battery B. The motor M has an output shaft 44 as shown. Secured to one end of the shaft 44 is a commutator 42 to which is fastened conducting strip 43. The conducting strip covers approximately 190° or, in other words, better than ½ of the surface of the commutator 52. A lever arm 45 is fixed to the other end of the shaft 44 which, through suitable connections, operates dampers 47 of the furnace. The circuit through the motor M will be maintained until the trailing edge of commutator strip 43 breaks the circuit between the brushes 41. Displaced 180° around the periphery of the commutator 42 is another pair of brushes 40, and before the conducting segment 43 opens the circuit between the pair of brushes 41, the leading edge of the segment 43 completes a circuit across the pair of brushes 40. However, no circuit is completed through brushes 40 at this time. The rotation of the shaft 44 is of such speed that ½ cycle of rotation will be completed during the time in which the contacts 26, 28 are held closed by the cam 16. When the temperature of the atmosphere drops below the value controlled by the setting of the arm 24, the free end 29 of element 20 will then be moved to the right by the sensing cam 16, thus causing the contacts 26, 27 to be closed. A circuit is now completed from the positive side of the battery through contacts 26, 27 now closed through brushes 40, by means of the fact that the conducting strip 43 is now positioned under these brushes, through the motor M to the other side of the battery. The shaft 44 will then complete another ½ revolution and cause the dampers to be turned on.

Another type of control is shown in Fig. 4. For this type of control, only a single set of contacts is necessary instead of the transfer contacts which have been just described above. Such type of control may be employed for an oil burner or a water circulator and requires the use of a cam and a set of contacts which will maintain the motor for the oil burner or circulator running during the time in which the sensing cam 16 is out of engagement with the thermal element 20. The action is as follows: When the temperature of the surrounding atmosphere drops below the selected value, contacts 26, 27 will be closed in the manner previously described to complete a circuit from one side of the secondary of transformer T through the points 27, 26 through the coil of the relay 50 to the other side of the secondary of the transformer. Before the cam 15 releases the control of the element 20, the cam 17 closes the contacts 31 completing a holding circuit for the relay as follows: From one side of the secondary of the transformer T, through contacts 31, contacts 52 of the relay 50, now closed, relay coil 50, to the other side of the secondary of transformer T. The contacts 26, 27 are again closed before contacts 31 open, and thus relay 50 is maintained energized until such time as cam 16 no longer causes contacts 26, 27 to close. Then, upon opening of the cam contacts 31, relay 50 will be deenergized and will remain so until contacts 26, 27 are again closed. The contacts 51 of the relay 50 control the motor of the oil burner or circulator, connecting it to the power line.

It is not intended that the scope of the invention be limited to the embodiments disclosed in the accompanying drawing or described above but only in accordance with the claims presented below.

What is claimed is as follows:

1. A thermostat for determining the operation of a control circuit in accordance with temperature conditions, comprising a bi-metallic strip, a rigid support for one end of said strip leaving the other end free for movement toward or away from a circuit operating position in response to temperature changes, a rotatable cam with a V-shaped leading edge, continuously operating drive means for rotating said cam causing said edge to be extended periodically into the path of the strip so as to sense the relative position of said strip with respect to a predetermined point along said path representative of the desired temperature and move the strip positively into circuit operating position according to the relative position of said strip at the sensing time.

2. A thermostat comprising a bi-metallic strip, a rigid support for one end of said element leaving the other end free for movement in a prescribed path in response to temperature changes, a rotating cam with an operating edge extending periodically into the path of said strip for positively moving said strip in a direction toward or away from a control position in said path, depending on which side of the edge of the cam the strip happens to be, and a stationary cam located opposite said rotating cam to release the strip from dead center with respect to the rotating cam, whereby the strip is always moved by the latter cam in a predetermined one of said directions.

3. A temperature controlling device comprising a heat responsive element, means for mounting said element so that it is free for movement along a prescribed path in response to temperature changes, a control contact in said path on each side of element, a periodically operating detector for detecting the relative position of said element with respect to a predetermined point on its path of movement representative of the desired temperature, drive means for causing the detector to move said element positively into engagement with one or the other of said control contacts dependent upon the relative position of the element with regard to a central position between said contacts at the time of detection and means coacting with said detector for causing the element when in said central position to be moved towards one of said contacts.

4. A thermostat comprising a bi-metallic strip, a pair of electrical contacts one on each side of said strip, a rigid support for one end of the strip leaving the other end free for movement in a prescribed path between said contacts in response to temperature changes, a rotatable cam with a V-shaped leading edge located so that during the rotation of the cam said edge extends periodically into the path of movement of the bi-metallic strip at a predetermined point representing the desired temperature in order to detect the relative position of the free end of said strip with respect to said predetermined point, and continuously operating drive means for rotating said cam to cause said strip to be moved into engagement with one or the other of said contacts in accordance with the relative position of the strip at the time of detection.

5. A thermostat for controlling an electrical circuit in accordance with temperature conditions comprising, in combination, a heat responsive element, means for mounting said element so that it is free for movement along a prescribed path toward or away from a circuit closing position in response to changes in temperature, a sensing device for determining periodically whether said element has reached a predetermined point in its path toward said circuit closing position, drive means for operating said device to cause said element to be moved positively into circuit closing position if it has reached said predetermined point at the sensing time, and a periodically closing switch in said circuit synchronized with by the aforesaid drive means to maintain said circuit closed for a predetermined time irrespective of the movement of the heat responsive element away from circuit closing position within said predetermined time.

6. A thermostat for controlling an electrical circuit in accordance with temperature conditions comprising, in combination, a bi-metallic strip, a rigid support for one end of said strip leaving the other end free for movement in a prescribed path toward or away from a circuit closing position in response to temperature changes, a sensing device for determining periodically whether said strip has reached a predetermined point in its path toward said circuit closing position, drive means for operating said device to cause said strip to be moved positively into circuit closing position if it has reached said predetermined point at the sensing time, and a periodically closing switch in said circuit also operated by said drive means and effective upon closure after said strip has reached circuit closing position for maintaining said circuit closed a predetermined time irrespective of the position of the strip during said predetermined time.

7. A thermostat for controlling an electrical circuit in accordance with temperature conditions comprising, in combination, a heat responsive element, a rigid support for one end of said element leaving the other end free for movement in a prescribed path toward or away from a circuit closing position in response to temperature changes, a rotatable cam having angular operating surfaces located so as to extend periodically within the path of movement of the heat responsive element during rotation of said cam to sense the relative position of said element along its path of movement, continuously-operating drive means for rotating the cam to cause said element to be moved positively into circuit closing position if the element has reached a predetermined relative position at the sensing time, a switch in said electrical circuit, and actuating means for closing said switch synchronized with the rotation of said cam to maintain the circuit energized for a predetermined time irrespective of the movement of the heat responsive element away from circuit closing position within said predetermined time.

8. A thermostat for controlling an electrical circuit in accordance with temperature conditions comprising, in combination, a temperature responsive strip, a rigid support for one end of said strip leaving the other end free for movement in a prescribed path toward or away from a circuit closing position in response to temperature changes, a rotatable cam having angular operating surfaces located so as to extend periodically within the path of movement of the temperature responsive strip during rotation of said cam to sense the relative position of said strip along its path of movement, continuously operating drive means for rotating the cam to cause said strip to be moved positively into circuit closing position to energize said circuit if the strip has reached a predetermined relative position at the sensing time, a pair of contacts in said electrical circuit and a second cam also rotated by said drive means for closing said contacts to maintain the circuit energized for a predetermined time irrespective of the movement of the temperature responsive strip away from circuit closing position within said predetermined time.

9. A device of the class described comprising a movable condition-responsive element movable in a given path towards or away from a control position and capable of movement transversely of said path, a member having a cam face at one side and movable periodically into said path to cam the element positively along said path towards the control position when said element is in a position within the range of the cam face, said member having a portion at one extremity of the cam face for engaging the element when in a position in line with said portion for effecting the movement of the element transversely of said path, and means thereupon effective to move the element along said path with respect to the control position.

10. A device of the class described, comprising an element responsive to conditions such as temperature or the like, means for mounting said element so that it is free for movement along a prescribed path in response to said condition, control contacts, one at each side of the element and alternatively coacting with the element when the element is in either of two alternative extreme positions of its path, said element being centrally located between said contacts for a predetermined condition, and periodically effective means for causing the element when in such centrally located position to be moved positively away from the central position.

11. A device of the class described, comprising a movable heat responsive element movable different extents along a prescribed path in response to conditions such as temperature or the like, a sensing device for determining periodically whether said element has reached a predetermined point in its path towards circuit closing position, drive means for operating said device to cause said element to be moved positively into circuit closing position if it has reached said predetermined point at the sensing time, a main circuit closed under control of said element when it is in circuit closing position, an electromagnetic condition-controlling instrumentality in said circuit, a holding circuit for said electromagnetic instrumentality effective upon its energization, and a periodically closing switch in said holding circuit synchronized with the aforesaid sensing means to maintain said holding circuit closed for a predetermined time irrespective of the movement of the heat responsive element away from circuit closing position within said predetermined time.

JOHN N. WHEELER.